March 1, 1966 T. G. NELSON 3,237,544

DATA PROCESSING SYSTEM

Filed April 16, 1963 5 Sheets-Sheet 1

THOMAS G. NELSON,
INVENTOR.

BY Stanley Belsky
Lawrence P. Benjamin
ATTORNEY & AGENT.

March 1, 1966 T. G. NELSON 3,237,544

DATA PROCESSING SYSTEM

Filed April 16, 1963 5 Sheets-Sheet 2

THOMAS G. NELSON,
INVENTOR.

BY Stanley Belsky
Lawrence Benjamin
ATTORNEY & AGENT.

March 1, 1966 T. G. NELSON 3,237,544

DATA PROCESSING SYSTEM

Filed April 16, 1963 5 Sheets-Sheet 3

THOMAS G. NELSON,
INVENTOR.

BY Stanley Belsky
Lawrence P. Benjamin
ATTORNEY & AGENT.

March 1, 1966 T. G. NELSON 3,237,544

DATA PROCESSING SYSTEM

Filed April 16, 1963 5 Sheets-Sheet 4

THOMAS G. NELSON,
INVENTOR.

BY Stanley Belsky
Lawrence P. Benjamin
ATTORNEY & AGENT

THOMAS G. NELSON,
INVENTOR.

BY Stanley Bilsky
Lawrence P. Benjamin
ATTORNEY & AGENT 3,237,544

DATA PROCESSING SYSTEM

Thomas G. Nelson, Sudbury, Mass., assignor to Itek Corporation, a corporation of Delaware Filed Apr. 16, 1963, Ser. No. 273,461
7 Claims. (Cl. 95—76)

This invention relates to data processing apparatus, and more particularly, to an improved photo-optical device for the direct contact duplication of data bearing media (wherein the inputs to the data processing apparatus is a master transparency to be duplicated and an unexposed film. The output of the data processing apparatus is a copy of the master in the form of exposure film).

While the data processing apparatus of the present invention can accommodate varying sizes of cut film, it is especially adapted for film slides or film chips 4 inches long and 2¾ inches wide. The film chips are useful in data handling system wherein each film chip bears a micro-reproduction of a document, such as an aerial photo-reconnaissance film and the film chips may be individually encoded with a unique code for purposes of searching and retrieval.

As is well known in the art, it is imperative that aerial photo-reconnaissance films have high resolution qualities and therefore, any associated film processing must be accomplished with minimum degradation of the original resolution characteristics. To do otherwise would result in the loss of essential information. Also, in situations where a document is microcopied and in turn copies made from that micro-photograph, the subsequent copies must suffer little, if any, degradation in each succeeding generation if their usefulness is to be retained.

One method for producing copies of a photograph is commonly referred to as contact printing. In one form of contact printing, transparent positive prints are made on an emulsion-coated film by placing the emulsion side of the film in direct contact with the emulsion side of a negative film. Light passing through the negative exposes the film in the reverse of what appears on a positive. This method has several advantages in that it is faster and simpler than most other methods and additionally where it is desired to make contact prints from a large negative, there is a noticeable improvement in fineness of detail over a projection print, of the same size, produced from a small negative.

While contact printing is particularly suited for certain applications, prior art contact printers have been found to have many disadvantages when used with small size cut films such as film chips of the order of 4 inches by 2¾ inches. This is because the prior art devices are primarily designed for large size film sheets; for example, up to 24 x 30 inches. For this size film as many as 176 tungsten printing lamps are required to produce a uniform exposure with 72 switches necessary to control this maze of lights. For smaller size film, the negative (film) must be masked to provide exposure control and to prevent incorrect exposure applied to borders and their immediate area. Also, the light pattern must be changed to accommodate only the smaller size film. These devices are very expensive and bulky and there is a good deal of wasted power because the entire device cannot be used.

To overcome these disadvantages the prior art suggests two solutions both of which met with only limited success. The first solution is to assemble a number of small size negatives into an array whose overall size is approximately equal to the capacity of the printer. However, it was very difficult to obtain uniform density over the whole array and dodging cannot be effectively employed because of the discontinuities between each negative and the non-uniform photographic characteristics from one negative to the next.

The second solution is through miniaturization. That is, the contact printer is made sufficiently small to accommodate one cut film at a time. Miniaturization, however, imposes its own limitations. On the large size sheets, the data population per unit area is smaller than a micro-photograph of the larger size sheets. One millimeter of off-center displacement of the large size sheet would result in the loss of data. However, the same displacement of a micro-photograph of the larger sheet results in a greater loss of data because of the high data population for the same unit area on the larger sheet. It is thus apparent that displacements in the large size contact printers is not as important as in a miniaturized contact printer. Further, alignment in contact printers is manual and depends upon the dexterity of the operator.

A further disadvantage to mere miniaturization is the inability to ensure absolute contact between negative and the unexposed film. Absolute contact is essential for the same reason as applied to problems in alignment since imperfect contact results in data loss as well as loss of resolution. Large size films rest on a platen surface with over 95 percent of its surface flat except for a small curl present along the marginal edges and a small ripple due to trapped air between the platen and the film. Variations in thickness in the area of imperfect contact, results in the formation of interference patterns such as Newton rings. With small size cut film, overcoming film curl characteristic is an important problem to be solved, otherwise valuable data is lost.

Further problems associated with contact printers are emulsion scratching and distortion due to hand and mechanical contact. These latter problem serve to further heighten the degree of degradation and become especially severe as the size of the film is reduced and the data per unit area is increased.

It is, therefore, a principal object of my invention to provide a new and improved data processing apparatus.

Another principal object of my invention is to provide a new and improved data processing apparatus wherein small size transparencies are duplicated utilizing contacting printing techniques.

Still another principal object of my invention is to provide a new and improved data processing apparatus wherein transparencies are duplicated automatically.

A further principal object of my invention is to provide a new and improved data processing apparatus wherein the output of the data processing apparatus yields duplicate prints all of which consistently display superior resolution characteristics.

A still further principal object of my invention is to provide a new and improved data processing apparatus capable of automatically producing high data resolution transparencies.

The features of my invention, which I believe to be novel, are set forth with particularity in the appended claims. The invention itself, however, both as to its organization and method of operation, together with further objects and advantages thereof may best be understood by reference to the following description, taken in conjunction with the accompanying drawings in which:

Figure 1:
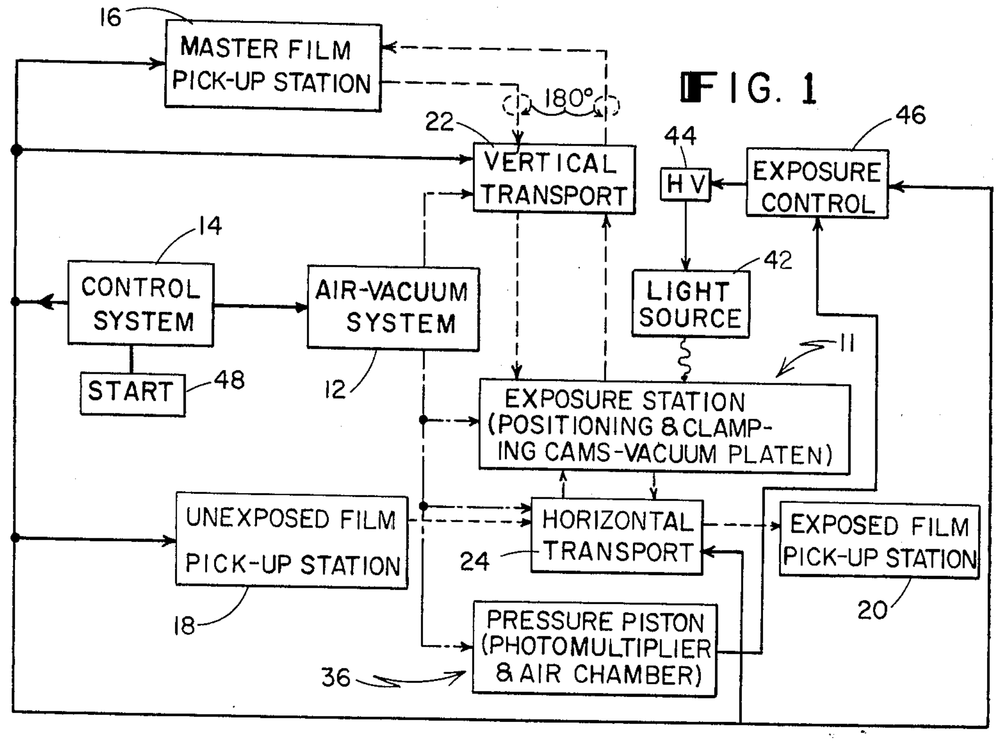
FIG. 1 is a schematic diagram, in block form, of my data processing apparatus illustrating certain principles of my invention.

Master chips in the form of either positive or negative transparency bearing data to be copied and unexposed chips of a size equal to the master chip represent the two inputs to the data processing apparatus. Exposed chips bearing the data of the master chip as a latent image represents the output of the data processing apparatus. While it is not essential to the practice of the invention those skilled in the photographic arts will appreciate that the master chips, the unexposed chips and the exposed chips must be protected by storing them in light-tight magazines. While not necessary, there are obvious advantages to providing the storage magazines with grooves for individually supporting the chips and removable cover for access to the interior of each of the magazines. Associated with each magazine, to reduce resolution degredation by handling, there may be an indexing device and a push-pull assembly. The former device enables selection of a desired master chip and an unexposed chip, while also indexing a groove in exposed chip magazine for the exposed chip. The latter assembly will push out the master chip and the unexposed chip and pull in the exposed chip from or into their respective magazines. A master chip is readied for copying when it is deposited by a push-pull assembly onto the master film pickup station 16 of FIG. 1. As shown in FIG. 1, the apparatus is comprised of a number of functional groups which cooperate to automatically complete a duplicating cycle. A cycle is commenced by energizing control system 14 through starting device 48.

In FIG. 1 the solid lines represent electrical connections between the control system 14 and the other functional groups such as an air vacuum system 12 while the dashed lines indicate mechanical cooperation or linkage between groups for transporting the chips. The wavy line is indicative of optical coupling between a light source 42 and an exposure station shown generally by arrow 11. As will be described hereinafter, cooperation between certain functional groups is effected by air vacuum system 12 and such cooperation is depicted in FIG. 1 by an alternate short and long dash line.

Figure 2:
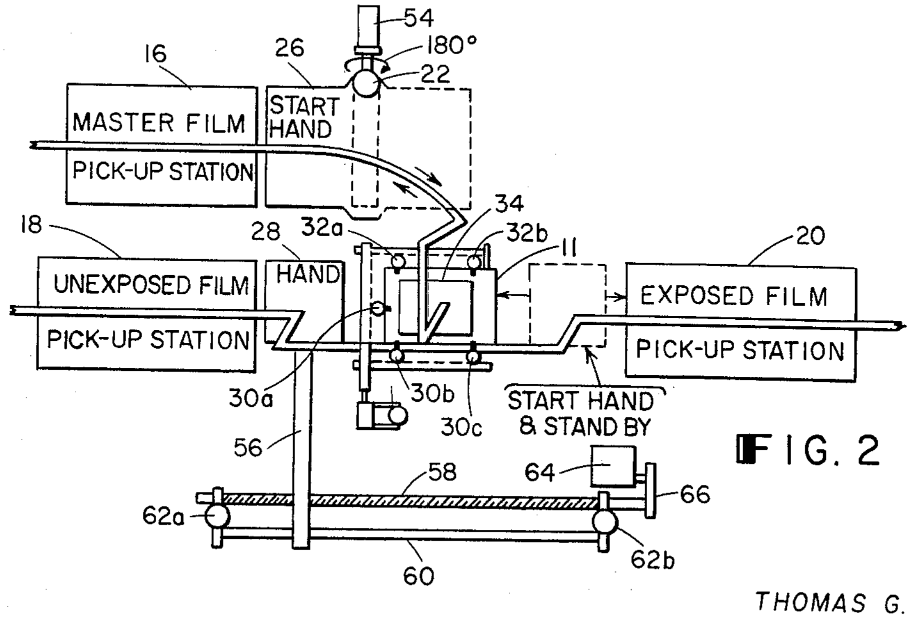
FIG. 2 is a schematic functional representation of one duplicating cycle of my data processing apparatus.

Referring to FIGS. 1 and 2 it will be seen that vertical transport 22 indexes a vacuum hand 26, further described in connection with FIGS. 6 and 7, to retrieve and hold a master chip from a master film pickup station 16. Vacuum hand 26 rotates counterclockwise through 180° while translating the transported chip downward to exposure station 11 where a plurality of positioning cams 30*a*, 30*b*, 30*c*, 30*a* and 32*b* register it and a vacuum is applied to hold it on a vacuum platen of exposure station 11. An exposed chip is retrieved from the unexposed film pickup station 18 by a vacuum hand 28 carried by horizontal transport 24 and deposited on exposure station 11 when the unexposed chip emulsion is in vis-a-vis relationship to the master chip emulsion. Again, the positioning cams register the unexposed chip, but it is now held in place by clamping means mounted on the positioning cams. A pressure piston assembly, shown generally by arrow 36 forces the chips against the vacuum platen, and air under pressure fills an air chamber on the face of pressure piston assembly 36 to flatten the chips against the vacuum platen thus insuring a good contact during exposure. The exposure cycle begins when exposure control system 46 triggers a power supply 44 to fire a light source 42 initiating the exposure cycle. The amount of light passing through the combination of vacuum platen, chips and air chamber, is measured by a photomultiplier tube. The information from the photomultiplier tube is fed to exposure control system 46 to shut off the power supply 44 and the light source 42 when the light intensity measured by the photomultiplier tube has reached a predetermined value. Upon completion of the exposure cycle, the pressure on piston assembly 36 is relieved and vacuum hand 28 associated with horizontal transport 24, retrieves the exposed chip and deposits it on an exposed film pickup station 20. Vacuum hand 26 of vertical transport 22 retrieves the master chip and retraces its motion to deposit it back into master film pickup station 16. This completes one duplication cycle which is repeated to either print more copies of the same master chip or another master chip.

Figure 7:
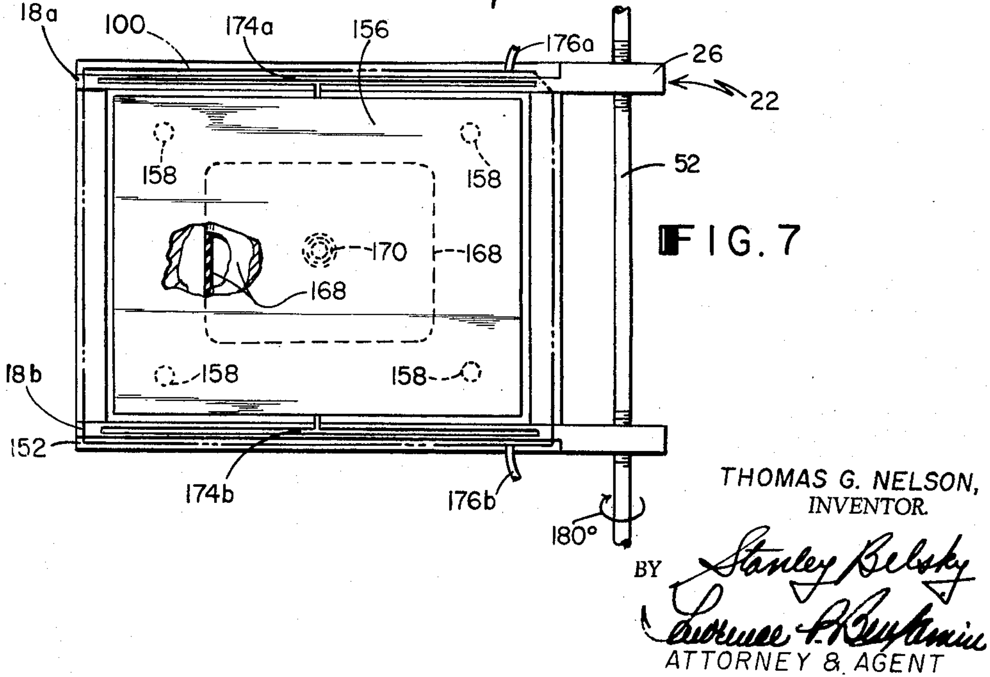
FIG. 7 is a plane view taken along line 7—7 of FIG. 6 showing the vacuum hand coupled to a vertical transport.

An example of a vertical transport 22 is shown in FIGS. 2 and 7. Vacuum hand 26 is appropriately secured to a pair of support bars 170*a* and 180*b* respectively. Support bars 180*a* and 180*b* respectively are fitted with ball races (not shown) which ride on ball screw 52. Ball screw 52 is rotated either clockwise or counterclockwise through 180° by reversible motor 54 the sequence of which is determined by control system 14. The "at rest" position of vacuum hand 26, prior to commencement of the duplication cycle, is between master film pickup station 16 and exposure station 11. At the commencement of the duplication cycle, motor 54 drives ball screw 52 to index vacuum hand 26 vis-a-vis master film pickup station 16 at which moment, the master chip is inserted therebetween. Vaccum hand 26 retrieves the master chip, motor 54 is reversed, rotating vacuum hand 26 180° counterclockwise while translating it downward to deposit the master chip on exposure station 11. After depositing the master chip, motor 54 is sequenced again to return vacuum hand 26 to its at rest position. After completion of the exposure cycle, motor 54 is sequenced to drive vacuum hand 26 down to exposure station 11 to retrieve the master chip, after which motor 54 is sequenced to retrace its motion and return the master chip to master film pickup station 16. Thereafter, motor 54 is sequenced to return vacuum hand 26 to its "at rest" position. It will be obvious to those skilled in the art that this procedure may be performed by other suitable devices.

An exemplary device for horizontal transport 24 is shown also in FIG. 2 where vacuum hand 28 is attached to a vacuum hand support 56 provided at its lower end with ball nuts, not shown, riding in the grooves of a ball screw 58. For stability vacuum hand support 56 is provided with a guide shaft 60 and a pair of carriage stops 62*a* and 62*b* respectively which limit the horizontal travel of vacuum hand support 56. A reversible motor 64 rotates ball screw 58 through gear coupling 66 the movement of which is sequenced through control system 14 of FIG. 1. The "at rest" position of the vacuum hand 26 is between unexposed film pickup station 18 and exposure station 11. As the master chip begins its trip from master film pickup station 16, motor 64 is sequenced to index vacuum hand 28 from its "at rest" position to a position vis-a-vis unexposed film pickup station 18 where it retrieves an unexposed chip. Motor 64 is now sequenced to drive vacuum hand 28 with the unexposed chip to exposure station 11 at a speed such that the unexposed chip arrives at exposure station 11 as vacuum hand 26 arrives at its "at rest" position after having deposited the master chip on exposure station 11. Vacuum hand 28 then deposits the unexposed chip on top of the master chip and both chips are indexed by motor 64 to a standby position intermediate exposure station 11 and exposed film pickup station 20. Upon completion of the exposure cycle, motor 64 is sequenced to index vacuum hand 28 from its standby position to the exposure station 11 for retrieving the exposed film from exposure station 11 and depositing it on exposed film pickup station 20. Thereafter, vacuum hand 28 is returned to its standby position until vertical transport 22 has removed the master chip at which time, vacuum hand 28 is returned to its at rest position.

Figure 6:
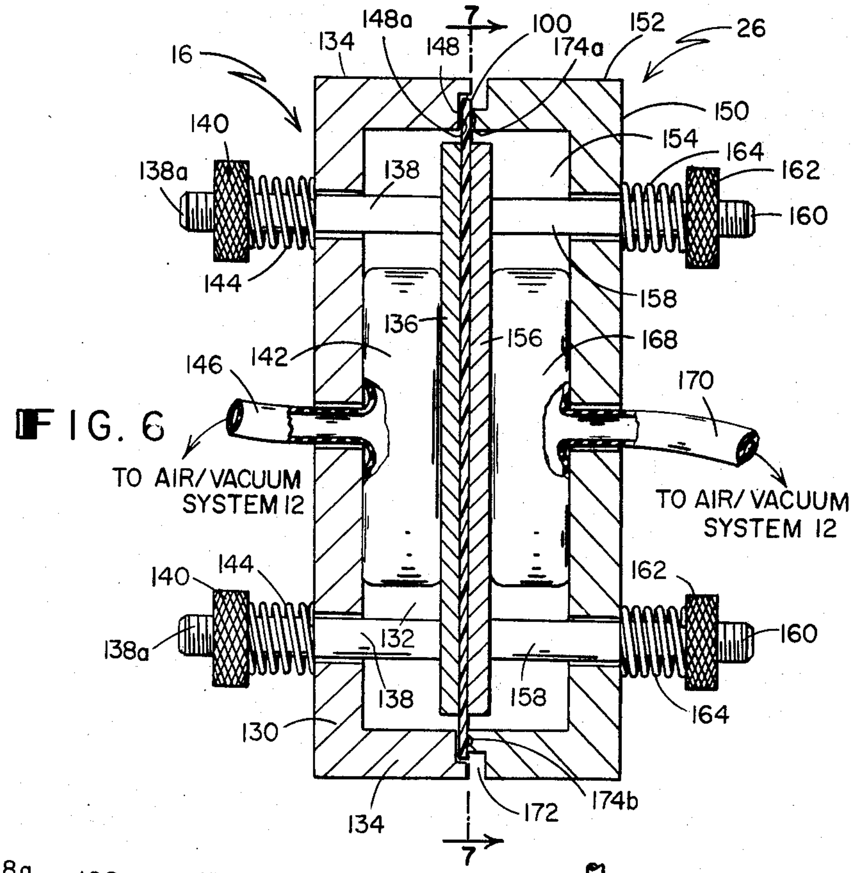
FIG. 6 is a cross-section of the master film pickup station and vacuum hand at the moment a master chip is transferred.

In FIG. 6, there is a cross section of master film pickup station 16 and vacuum hand 26 at the moment of master chip pickup. It should be here noted that unexposed film pickup station 18 and exposed film pickup station 20 of FIGS. 1 and 2 are similar in construction and operation to master film pickup station 16. Therefore, the following description of master film pickup station 16 will serve as an exegesis for the construction and operation of pickup stations 18 and 20.

At the commencement of the duplication cycle, control system 14 sequences vertical transport 22 to index vacuum hand 26 vis-a-vis with the film in master film pickup station 16. Referring now to FIG. 6, the master film pickup station shown generally by arrow 16 has a back wall 130 and side walls 134 to define a chamber 132. Side walls 134 are provided with a recess 148 having a lip 148*a* and a depth approximately equal to the thickness of a master chip 100 such that master chip 100 is received in recess 148. Plate 136 is mounted for movement in chamber 132 parallel to wall 130 by four rods 138 fixed to the inner surface of plate 136 and slidably mounted through apertures in wall 130 to extend beyond wall 130. The ends of rods 138 which so extend, are provided with a threaded portion 138*a* to accommodate a thumb nut 140 and, between thumb nut 140 and wall 130, there is a tension spring 144 so that plate 136 is spring loaded while the tension thereon may be regulated by thumb nut 144. The "at rest" position of plate 136 is within chamber 132. Within chamber 132 and between wall 130 and plate 136 is an air bag 142 connected to hose 146 which, in turn, is connected to air system 12. When air, under pressure, is pumped into air bag 142, plate 136 is driven away from wall 130 by the pressure in the bag. The rods 138 maintain the plane of plate 136 which faces master chip 100 in a position parallel to chip 100. When the pressure in air bag 142 is relieved, the spring tension of springs 144 draw the plate 136 back to its "at rest" position. It is to be noted that both vacuum hands 26 and 28 respectively, are similar on construction and operation and therefore the description of vacuum hand 26 in FIGS. 6 and 7 suffices to describe vacuum hand 28. Further, common elements are similarly numbered.

Referring now to FIGS. 6 and 7 vacuum hand 26, at 26 has a back wall 150 and side walls 152 to define chamber 154. Plate 156 is mounted for movement in chamber 154 parallel to wall 150 by being affixed to four rods 158. Each of rods 158 are fixed to the inner surface of plate 156 and are slidably mounted through apertures in wall 150. The ends of rods 158 extend beyond the wall 150 and each end is provided with threaded portions 160 to accommodate a thumb nut 162. Between thumb nut 162 and wall 150 is a tension spring 164 so that plate 156 is spring loaded while the tension thereon may be regulated by thumb nut 156. The "at rest" position of plate 156 is within chamber 154. Within chamber 154 and between wall 150 and plate 156 is an air bag 168 which, when it is inflated by means of connection 170, drives plate 156 away from wall 150 by the pressure in the bag. The rods 158 maintain the plane of plate 156 which faces master chip 100 in a position parallel to chip 100. Side walls 152 are provided with indents 172 to receive the registration cams 30*a*, 30*b*, 30*c*, 32*a*, 32*b* and clips 78 (FIGS. 2, 3, 5, 8, 9, and 10). Between indents 172 and chamber 154 is a pair of vacuum grooves 174*a* and 174*b* respectively as shown in greater detail in FIG. 7. In this latter figure, vacuum groove 174*a* is positioned along the upper horizontal portion of side walls 152 and vacuum goove 174*b* is along the lower horizontal portion of side walls 152. The pair of vacuum grooves 174*a* and 174*b* respectively are disposed to cooperate with the peripheral margins of master chip 100, that is, with that portion of master chip 100 that is not bearing data. A hose connection 176*a* and 176*b* provides connection between vacuum grooves 174*a* and 174*b* respectively and are joined at a common connection, not shown, in air vacuum system 12.

At the commencement of the duplication cycle, control system 14 drives vertical transport 22 to index vacuum hand 26 into a vis-a-vis relation with master film pickup station 16. The master chip 100 is inserted between plates 136 and 156 in recess 148. Air bags 146 and 156 are inflated, driving plates 136 at 156 toward each other such that master chip 100 is now pressed therebetween to a substantially flat configuration removing any curl that may be present in master chip 100. At this moment vacuum is applied to vacuum grooves 174*a* and 174*b* respectively to firmly hold master chip 100 flat on plate 156. Similarly, the unexposed chip is delivered to vacuum hand 28 by unexposed film pickup station 20.

Figure 3:
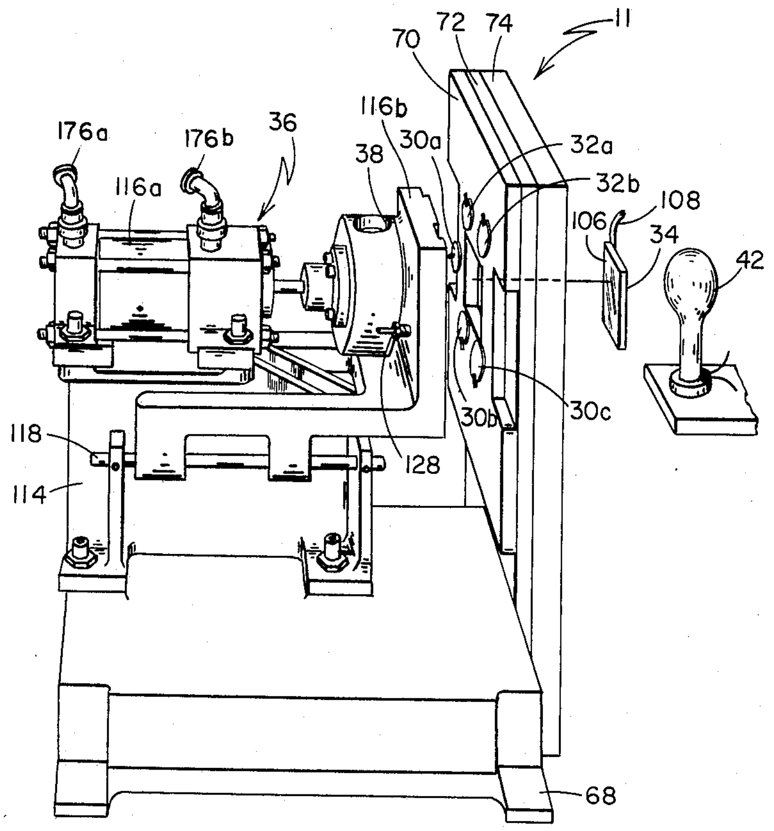
FIG. 3 is a perspective view of the contact printer of my data processing apparatus.

Referring now to FIG. 3, there is shown the preferred embodiment of a contact printer for the data processing apparatus. The various assemblies that comprises the contact printer may, for example, be mounted on a base 68. The exposure station, shown generally by arrow 11, is coupled to base 68 by back support 74 while exposure platen 70 is affixed to a platen support member 72, which is in turn appropriately secured to back support 74. Exposure platen 70, platen support 72, and back support 74 are provided with an aperture for receiving light therethrough from light source 42. Suitably mounted in the aperture and in exposure platen 70 is the vacuum platen 34 consisting of a polished optical glass sheet treated to prevent the formation of Newton rings. One surface of glass sheet 34 is coplanar with the plane of exposure platen 70 and is provided with a vacuum track 106 disposed in its circumferential margins. Vacuum groove 106 is coupled to air vacuum system 12 by a hose connection 108. Thus, when a master chip is transferred to exposure station 11 by vacuum hand 26, vacuum is applied to firmly hold the master chip along its back peripheral margin against glass sheet 34.

Exposure station 11 further includes at least three eccentrically mounted, radial positioning or indexing cams 30*a*, 30*b* and 30*c* respectively and at least two radial clamping cams 32*a* and 32*b* respectively, rotatably mounted in exposure platen 70, the operation of which will be described in more detail in the discussion of FIG. 5. Each cam is provided with a holding clip 78. Cam 30*a* is disposed along one vertical edge of the vacuum platen while cams 30*b* and 30*c* respectively are disposed along the bottom horizontal edge. Cams 32*a* and 32*b* are disposed along the upper horizontal edge. In their "at rest" position, the distance between the center of rotation of cams 30*a*, 30*b*, and 30*c* and a point on its circumference closest to the edge of the vacuum platen is minimal. For registering a chip, cam 30*a* is rotated 180° clockwise so that the distance is now maximum and defines the chip registration position.

Clamping cams 32*a* and 32*b* simultaneously are rotated 180° clockwise. The rotation of the cams through 180° allows clips 78 to hold the chip during registration. If the chip is the master, vacuum is then applied to the vacuum platen to firmly hold the master chip against glass sheet 34 and the cams counter rotated to their "at rest" position. If the chip is the unexposed chip, the cams are maintained in their rotated position to support the unexposed chip during registration and exposure.

Figure 5:
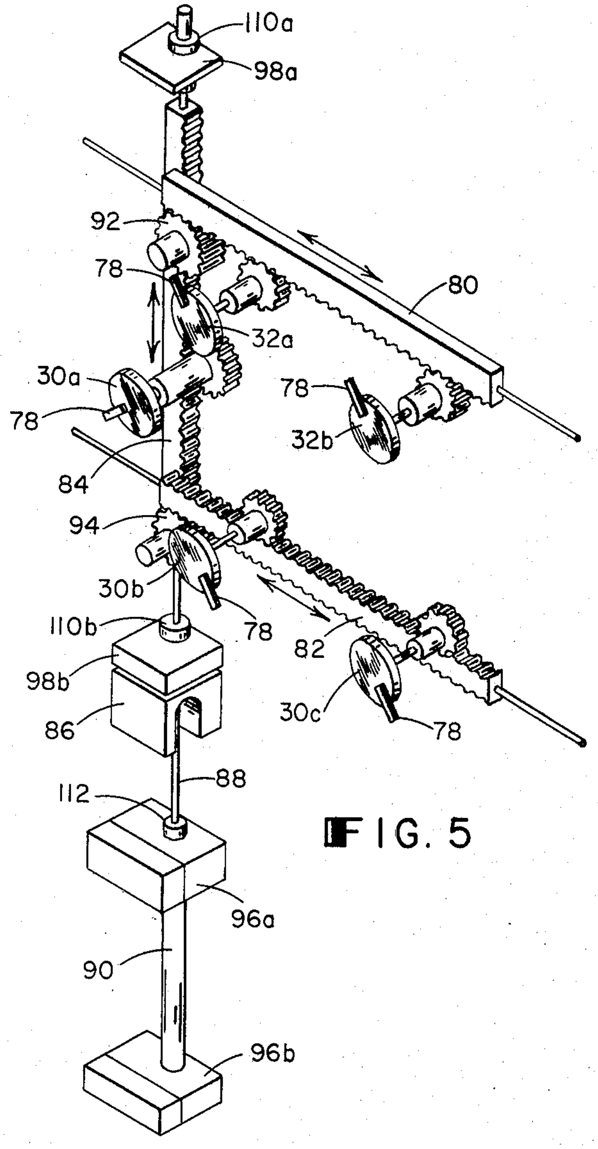
FIG. 5 is a perspective view of the cam driving mechanism.

Referring now to FIG. 5 it will be seen that clamping cams 32*a* and 32*b* are rotated by upper horizontal rack 80 and horizontal positioning cams 30*b* and 30*c* are rotated by a lower horizontal rack 82. The vertical positioning cam 32_a_ is rotated by the vertical rack 84. Vertical rack 84 and upper horizontal rack 80 are coupled by an upper pinion gear 92 while a similar pinion gear 94 couples vertical rack 84 to lower horizontal rack 82. The cam mechanism is coupled to the rear of back support 74 (FIG. 3) by a plurality of ring blocks 96_a_, 96_b_, 98_a_ and 98_b_. Vertical rack 84 is provided at both ends with a shaft 88 which shaft rides in ball rings 110_a_ and 110_b_ and fits into the apertures of ring blocks 98_a_ and 98_b_. Similarly, upper and lower horizontal racks 80 and 82 are provided with shafts which are mounted for slidable movement in ball rings mounted in ring blocks, however, these latter ring blocks and ball rings have been omitted from FIG. 5 for purposes of clarity. The lower portion of vertical rack 84 is joined by a coupling 86 to a piston shaft 88 of an air cylinder 90. Air cylinder 90 is supported by ring clamps 96_a_ and 96_b_ while shaft 88 is slidably mounted in a ball bushing housing 112 in ring clamp 96_a_. Air cylinder 90 is in turn coupled to air vacuum system 12 and control system 14. The distance between coupling 86 and ring block 98_b_ limits the upper travel of vertical rack 84 when air under pressure is applied to air cylinder 90. The distance corresponds to 180° of rotation of any cam, either in a clockwise or counterclockwise direction.

Thus, when the master chip is delivered to exposure platen 70 by vacuum hand 26 (FIGS. 3 and 7), the master chip 100 is received between the cams and specifically rests on positioning cam 30_b_ and 30_c_. Air pressure in air cylinder 90 is increased to drive piston 88 upward and thereby driving vertical rack 84. As vertical rack 84 is moved upward, pinion gears 92 and 94 respectively are rotated clockwise to drive upper and lower horizontal racks 80 and 82 respectively to the right. Consequently, cams 30_a_, 32_a_ and 32_b_ are rotated clockwise and horizontal positioning cams 30_b_ and 30_c_ are rotated counterclockwise from their "at rest" position. Master chip 100 is then stabilized during registration by clips 78.

Figures 8, 9, 10:
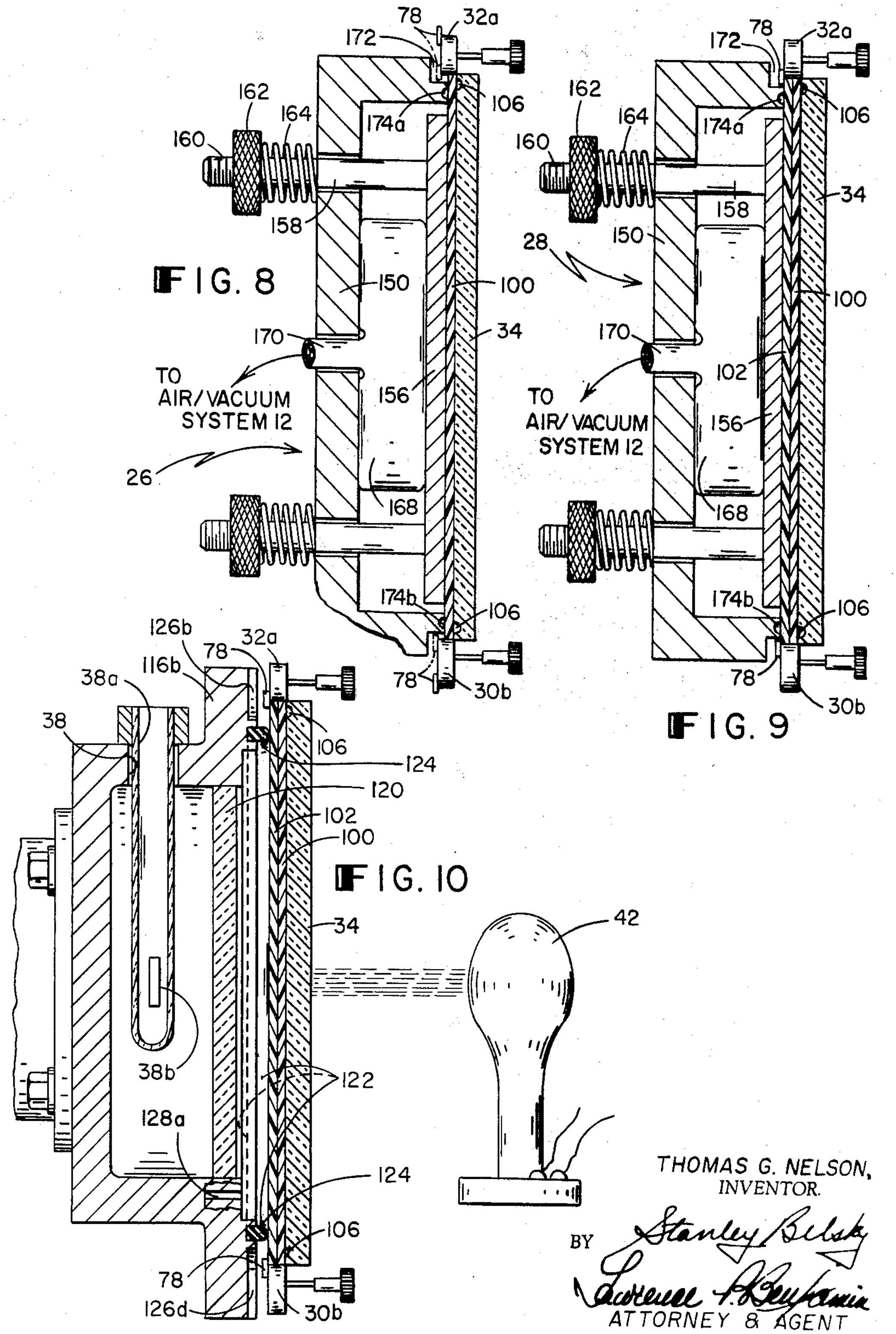
FIG. 8 is a cross-section of the vacuum hand of FIGS. 6 and 7 at the moment of delivery of a master chip to the exposure station.
FIG. 9 is a cross-section of the vacuum hand at the moment of delivery of an unexposed chip to the exposure station.
FIG. 10 is a cross-section of the pressure piston, chips and exposure station during the exposure cycle of my apparatus.

Reference is now made to FIG. 8 which shows a cross section of the vacuum hand of FIGS. 6 and 7 at the moment of delivery of the master chip to the exposure station and also serves to illustrate the registration action of the positioning cams. Immediately upon delivery of master chip 100 to vacuum platen 34 by vacuum hand 26, the air system 12 relieves the pressure in air bag 168. By reason of the pressure applied thereto by the combination of thumb nuts 162 and springs 164 pressure plate 156 is retracted due to the coupling of shafts 158. With the removal of the mechanical pressure, the vacuum is also removed from vacuum grooves 174_a_ and 174_b_. Thus, at this point, master chip 100 is resting solely on the lower cams indicated here as 30_b_. Once the cams have rotated and registration clips 78 are in the position indicated by the dotted lines, master film 100 is properly registered and an appropriate vacuum is applied via line 108 (FIG. 3) to vacuum grooves 106. As soon as the vacuum is applied to grooves 106, the master chip 100 is firmly held to vacuum platen 134 and the vacuum hand 26 may now be removed with no danger of film chip 100 moving out of registry. The function of back 150, air connection 170, and groove 172 have been described in detail previously, in connection with FIG. 7 and hence require no additional explanation.

The next step in the procedure may best be illustrated by reference to FIG. 9 which illustrates a cross section of the vacuum hand 28 which is utilized to transport the unexposed film chip in registry with the master film chip. In this view, vacuum hand 28 is shown having a back 140 and grooves 172 for indexing with the clips 78 mounted on cams 32_a_ and 30_b_. Pressure plate 156, having connecting rods 158, springs 164, thumb nuts 162 and threaded portions 160 are similar in function to those previously described. The unexposed film chip 102 is picked up from the unexposed film pickup station 18 (FIG. 2) and transported by means of vacuum hand 28 to the exposure station. The unexposed film chip is held in place on the vacuum hand by means of vacuum grooves 174_a_ and 174_b_ of vacuum hand 28.

Having been brought over into position the vacuum is removed from grooves 174_a_ and 174_b_ and simultaneously therewith, pressure plate 156 is forced against the chip 102 by means of air bag 168 which has air pressure applied thereto by means of connection 170. At this point, indexing cams 32_a_ and 30_b_ rotate through their 180° of rotation now indexing the unexposed film chip 102. Once this indexing is completed, clips 78 will be in the position shown. The vacuum having been removed from vacuum grooves 174_a_ and 174_b_, the air pressure applied to air bags 168 may now be removed allowing the pressure plate 156 to retract into the space previously occupied by the filled air bag 168 and vacuum hand 28 may now be removed.

Figure 4:
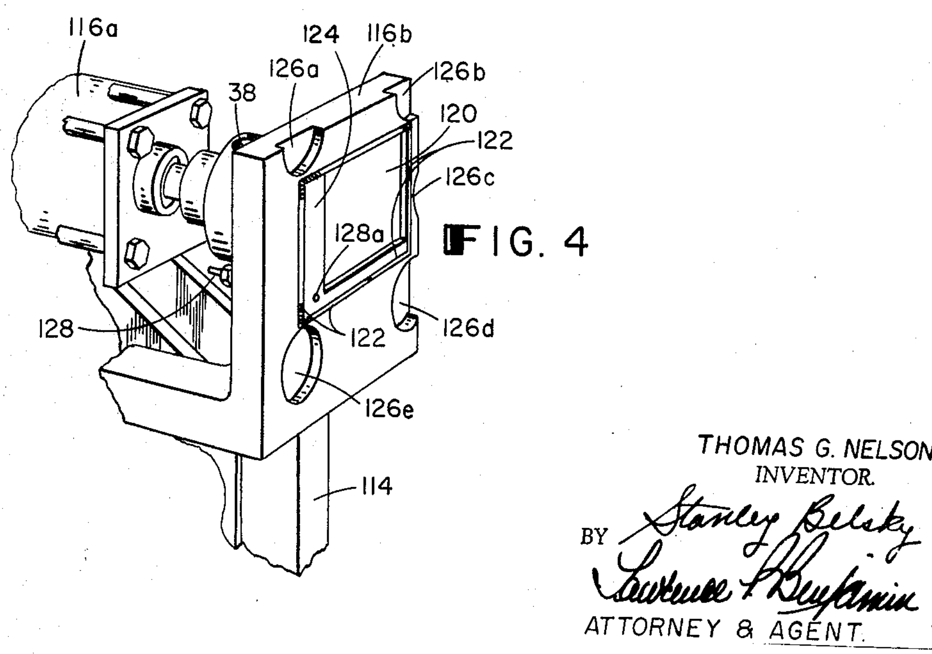
FIG. 4 is a partial perspective view of the face of the pressure piston of the contact printer of FIG. 3.

For the illustration of the remaining steps, reference is made to FIGS. 3, 4, and 10 which shows an air cylinder and pressure piston assembly 36 affixed to base 68 by a standoff 114. Secured to standoff 114 is an air cylinder 116_a_ while its pressure piston 116_b_ is movably supported on two piston guide shafts 118, only one of which is shown. As is best shown in FIGS. 4 and 10, the face of the pressure piston 116_b_ contains a partially masked, diffuse exposure control window 120 set in an air chamber 122 formed within the inner boundary of gasket 124. Air chamber 122 is provided with an air vent 128_a_ which is coupled to coupling 128 for attachment to air vacuum system 12. Surrounding the face of the pressure piston are five indents, 126_a_ through 126_e_ respectively, for covering the five cams located around the exposure platen.

Directly behind window 120 is a photomultiplier tube 38_b_ (FIG. 10) in an appropriate mounting 38_a_ located in aperture 38 so that photomultiplier tube 38_b_ is in line with the light path from light source 42 to measure the amount of light passing through the chips during exposure. Photomultiplier tube 38_b_ is coupled to the exposure control system 46 to extinguish light source 42 to end the exposure cycle after sufficient light has passed through both chips.

With the vacuum applied to grooves 106 holding master chip 100 and cams 32_a_ and 30_b_, etc., with the associated clip holding the unexposed chip against the master chip, the system is now ready for the exposure cycle which is best illustrated by FIGS. 3, 4, and 10. Air under pressure is forced through the appropriate nozzle 176_a_ into air cylinder 116_a_ causing piston 116_b_ to be moved against platen 70. The five pressure piston indents 126_a_ through 126_e_ mate with cams 32_a_ and 32_b_ and 30_a_, 30_b_, and 30_c_. At the same time, gasket 124 is forced against the unexposed film chip. With the pressure piston in its most forward position, air is pumped through coupling 128 and aperture 128_a_ into chamber 122 formed by gasket 124 to uniformly press the entire surface of the chips together and against platen 34. At this moment, light source 42 is fired "on" and the exposure cycle initiated. When the light passing through the two chips, as measured by the photomultiplier tube 38_b_, reaches a predetermined level, the exposure control system 46 and the light source 42 is turned off to complete the exposure cycle.

Immediately thereafter the pressure in piston 36 is relieved via nozzle 176_b_ causing piston 116_b_ to retract. Vacuum hand 28 picks up the now exposed film chip 102 and transports it to the exposed film pickup station 20 (FIG. 2) for storage and subsequent processing. The vertical transport vacuum hand 26 picks up the master film chip and returns it to the master film pickup station 16 (FIG. 1).

While I have described what is presently considered a preferred embodiment of my invention, it will be obvious to those skilled in the art that various changes and modifications may be made therein without departing from the inventive concept, and, it is aimed in the appended claims to cover all such changes and modifications as fall within the true spirit and scope of my invention.

What I claim is:

1. A data processing system, comprising:
a plurality of data bearing media;
a plurality of data receiving media;
an exposure platen;
means selectively transporting one data bearing medium from the plurality of data bearing media and one data receiving medium from the plurality of data receiving media to exposure platen;
a plurality of rotatable, radial cams engaging at least a lower edge and a side edge of a medium on an edge of the cams;
means rotating the cams to sequentially arrange the medium disposed thereon into registration position;
support means coupled to the drive means for holding the data bearing medium in the registration position;
means coupled to the support means for restraining the data receiving medium in the registration position;
pressure means forcing both selected media against the exposure platen; and
exposure means coupled to the pressure means for exposing the data receiving medium to the data on the data bearing medium.

2. A data processing system, comprising:
a plurality of data bearing media;
a plurality of data receiving media;
an exposure platen;
means selectively transporting one data bearing medium from the plurality of data bearing media and one data receiving medium from the plurality of data receiving media to exposure platen;
a plurality of rotatable, radial cams engaging at least a lower edge and a side edge of a medium on an edge of the cams;
means rotating the cams to sequentially arrange the medium disposed thereon into registration position;
a vacuum groove disposed in the exposure platen;
a source of vacuum coupled to the vacuum groove to evacuate air from the groove and to engage the margins of the data bearing medium to hold the data bearing medium in the registration position;
control means for applying the vacuum to the groove when the medium is in registration position;
means restraining the data receiving medium in the registration position;
pressure means forcing both selected media against the exposure platen; and
exposure means coupled to the pressure means for exposing the data receiving medium to the data on the data bearing medium.

3. A data processing system, comprising:
a plurality of data bearing media;
a plurality of data receiving media;
an exposure platen;
means selectively transporting one data bearing medium from the plurality of data bearing media and one data receiving media from the plurality of data receiving media to the exposure platen;
a plurality of rotatable, radial cams engaging at least a lower edge and a side edge of a medium on an edge of the cams;
means rotating the cams to sequentially arrange the medium disposed thereon into registration position;
a vacuum groove disposed in the exposure platen to engage the margins of the data bearing medium in the registration position;
a source of vacuum coupled to the vacuum groove to evacuate air from the groove;
control means for applying the vacuum to the groove to hold the data bearing medium in registration position;
a clip connected to the face of each of the plurality of cams to engage the margins of the data receiving media as the plurality of cams rotate for restraining the data receiving medium in the registration position;
pressure means forcing both selected media against the exposure platen; and
exposure means coupled to the pressure means for exposing the data receiving medium to the data on the data bearing medium.

4. A data processing system, comprising:
first storage means holding a plurality of data bearing media;
second storage means holding a plurality of data receiving media;
an exposure platen;
transport means selectively conveying one data bearing medium of the plurality of data bearing media from the first storage means and one data receiving medium of the plurality of data receiving media from the second storage means to the exposure platen;
a plurality of rotatable, radial cams engaging at least a lower edge and a side edge of a medium on an edge of the cams;
means rotating the cams for sequentially arranging the medium disposed thereon into registration position;
a vacuum groove disposed in the exposure platen to engage the margins of the data bearing medium in the registration position;
a source of vacuum coupled to the vacuum groove to evacuate air from the groove;
control means for applying the vacuum to the groove to hold the data bearing medium in registration position;
a clip connected to the face of each of the plurality of cams for engaging the margins of the data receiving medium as the plurality of cams rotate for restraining the data receiving medium in the registration position;
pressure means forcing both selected media against the exposure platen;
a light source coupled to the pressure means for exposing the data receiving media to the data on the data bearing media;
control means for measuring the amount of light transmitted through both media; and
means responsive to the control means for terminating light from the source when the light transmitted through both media reaches a predetermined value.

5. The data processing system of claim 4 further comprising:
third storage means for holding a plurality of exposed data receiving media;
means relieving the pressure means when the light transmitted through both media reaches the predetermined value;
means sequentially disengaging the exposed data receiving medium and the data bearing medium; and
means selectively transporting the exposed data receiving medium to the third storage means and the data bearing medium to the first storage means.

6. The data processing system of claim 5, wherein the transport means further comprises:
an open chamber having a back wall, side edges, and an open end;
a pressure plate within the chamber at the open end, parallel to the back wall and mounted for movement normal thereto;
an air bag disposed between the pressure plate and back wall;
a source of air pressure coupled to the air bag;

a groove disposed in the side edges of the transport means;

a source of vacuum coupled to the groove to evacuate air therefrom and to engage the margins of the medium; and control means coupled to the source of air pressure and to the source of vacuum, whereby, when air is applied to the air bag driving the plate against the medium and a vacuum applied to the groove holding the medium to the transport means, the medium is supported and maintained in a substantially planar configuration.

7. The combination of a data processing system having a plurality of data bearing media, a plurality of data receiving media, an exposure station, and transport means for sequentially selecting one data bearing medium from each of the plurality of media and one data receiving medium from the plurality of data receiving media and transporting the selected media to the exposure station for exposure, the transport means comprising:

an open chamber having a back wall, side edges and an open end;

a pressure plate within the chamber at the open end parallel to the black wall and mounted for movement normal thereto;

an air bag disposed between the pressure plate and back wall;

a source of air pressure coupled to the air bag;

a groove disposed in the side edges of the transport means;

a source of vacuum coupled to the groove to evacuate air therefrom and to engage the margins of a medium; and control means coupled to the source of air pressure and to the source of vacuum, whereby when air is applied to the air bag driving the plate against the medium and a vacuum applied to the groove holding the medium to the transport means, the medium is supported and maintained in a substantially planar configuration.

References Cited by the Examiner

UNITED STATES PATENTS

| | | | |
|---|---|---|---|
| 2,220,526 | 11/1940 | Kluitmann | 95—77.5 |
| 2,947,234 | 8/1960 | Faeber | 95—77.5 |
| 3,022,716 | 2/1962 | Smith et al. | 95—77.5 |
| 3,077,401 | 2/1963 | Van der Grinten | 95—73 |
| 3,091,169 | 5/1963 | Taini et al. | 95—77.5 |
| 3,099,199 | 7/1963 | Bornemann | 95—73 |

EVON C. BLUNK, *Primary Examiner.*